July 1, 1969 E. RABE 3,452,991

SOUND REPRODUCING APPARATUS

Filed Nov. 1, 1966

INVENTOR
Erich Rabe

BY
Michael S. Striker
ATTORNEY

United States Patent Office 3,452,991
Patented July 1, 1969

3,452,991

SOUND REPRODUCING APPARATUS

Erich Rabe, Nuremberg, Germany, assignor to Schildkroet AG vorm. Rheinische Gummi- und Celluloidfabrik, Mannheim-Neckarau, Germany Filed Nov. 1, 1966, Ser. No. 591,303
Claims priority, application Germany, July 23, 1966, Sch 39,306
Int. Cl. G11b 3/00, 3/62, 3/10
U.S. Cl. 274—9 20 Claims

ABSTRACT OF THE DISCLOSURE

A sound reproducing apparatus wherein the tone arm is biased against an inclined contact face of the loudspeaker diaphragm and thereby causes its needle to penetrate into the sound groove of a rotary record carrier. The plane of the record carrier is inclined with reference to the plane of the contact face on the diaphragm in such a way that the tone arm and its needle are wedged between the diaphragm and the record carrier when the tone arm bears against the contact face.

The present invention relates to sound reproducing apparatus in general, and more particularly to improvements in so-called talking machines which can be installed in or on dolls and/or other types of toy devices. Still more particularly, the invention relates to improvements in the actual sound reproducing units of such apparatus, namely, in the construction and mounting of the loudspeaker diaphragm, tone arm and mechanism which controls movements of the tone arm.

Presently known sound reproducing apparatus for use in dolls and like toy devices invariably comprise a substantially disk-shaped record carrier which is provided with one or more sound grooves tracked by the needle of a tone arm, a motor which can rotate the record carrier, and a loudspeaker diaphragm which can be fixedly mounted in the housing of the apparatus or is mounted directly on the tone arm. In order to insure satisfactory reproduction of sound by transmission of vibrations to the diaphragm, the latter is often biased in a direction to maintain the needle in uninterrupted contact with the record carrier while the record carrier rotates. The diaphragm must be moved away from the record carrier (or vice versa) upon completed reproduction of a sound sequence so that the needle can be returned into the lead-in portion of a sound groove. If the diaphragm is movable with reference to the record carrier, it must be mounted on a deformable bridge which is deformed in response to energization of the motor. If the record carrier is to be moved with reference to the diaphragm, its shaft is tiltably mounted in the housing and is tilted during energization of the motor to allow for return movement of the needle to its starting position. It was found that such solutions are either too complicated and too expensive or bring about distortion of sound during reproduction because the needle is likely to move toward and away from contact with the record carrier or the tone arm will move into and out of contact with the diaphragm.

Accordingly, it is an important object of the present invention to provide a very simple, compact, inexpensive and rugged sound reproducing apparatus wherein satisfactory reproduction of sound is insured in a novel and unobvious way.

Another object of the invention is to provide a sound reproducing apparatus of the type wherein the diaphragm is stationary but the axis of the record carrier need not be tilted in order to disengage the record carrier from the needle of the tone arm.

A further object of the invention is to provide a sound reproducing apparatus of the just outlined characteristics wherein the tone arm is held in satisfactory vibration-transmitting contact with a fixed loudspeaker diaphragm and wherein the needle of the tone arm is simultaneously urged into requisite engagement with the record carrier.

An additional object of the instant invention is to provide a sound reproducing apparatus wherein the needle of the tone arm is movable to a starting position in automatic response to energization of the motor which drives the record carrier and wherein such movement of the needle is brought about by a very simple, rugged and reliable lifting or disengaging mechanism.

A concomitant object of the invention is to provide a novel mounting for the tone arm of a miniature sound reproducing apparatus which can be used in or on various types of toy devices.

Still another object of my invention is to provide a toy device wherein vibratory movements of a tone arm whose needle tracks a sound groove of a moving record carrier are transmitted to a fixed diaphragm in a novel and improved way so that the reproduction of sound will take place without distortion.

An additional object of the invention is to provide a sound reproducing apparatus wherein all sensitive parts are fully concealed so that they are out of reach during manipulation of the apparatus and are unlikely to be damaged or destroyed by children if the apparatus is embodied in a toy device.

With the above objects in view, one feature of my present invention resides in the provision of a sound reproducing apparatus which may be used in or on toy devices and comprises a housing or frame which constitutes a main support, a preferably disk-shaped record carrier mounted in the housing for rotation about a predetermined axis and having an exposed surface provided with at least one sound groove having a lead-in portion located at a first distance and a terminal portion located at a second distance from such axis, a loudspeaker diaphragm carried by and preferably fixedly secured to the housing so as to be adjacent to but still spaced from the exposed surface of the record carrier, a tone arm mounted in the housing and having a needle arranged to track the sound groove and to thereby travel substantially radially of the record carrier, and contact means provided on the diaphragm and having a contact face which is engaged by the tone arm while the needle tracks the sound groove. The contact face and the exposed surface of the record carrier are inclined with reference to each other and preferably make an angle of between 45 and 90 degrees. The contact face slopes toward the exposed surface, as seen in the direction of rotation of the record carrier.

The apparatus further comprises a motor, preferably a spring motor, which can be energized to rotate the record carrier, and energizing means preferably including a drawstring which can be operated by hand to energize the motor. The needle of the tone arm can be moved away from the record carrier in response to operation of the drawstring so that the needle can thereupon return from registry with the terminal portion into registry with the lead-in portion of the sound groove. Such movement of the needle can be effected by suitable resilient means.

The novel features which are considered as characteristic of the invention are set forth in particular in the appended claims. The improved sound reproducing apparatus itself, however, both as to its construction and its mode of operation, together with additional features and advantages thereof, will be best understood upon perusal of the following detailed description of certain specific embodiments with reference to the accompanying drawings, in which:

Figure 1:
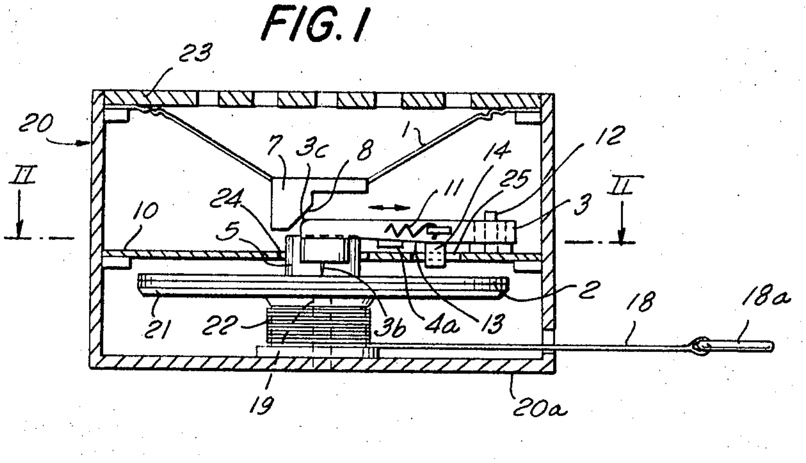
FIG. 1 is a transverse vertical section through a sound reproducing apparatus which embodies one form of the present invention.
Figure 2:
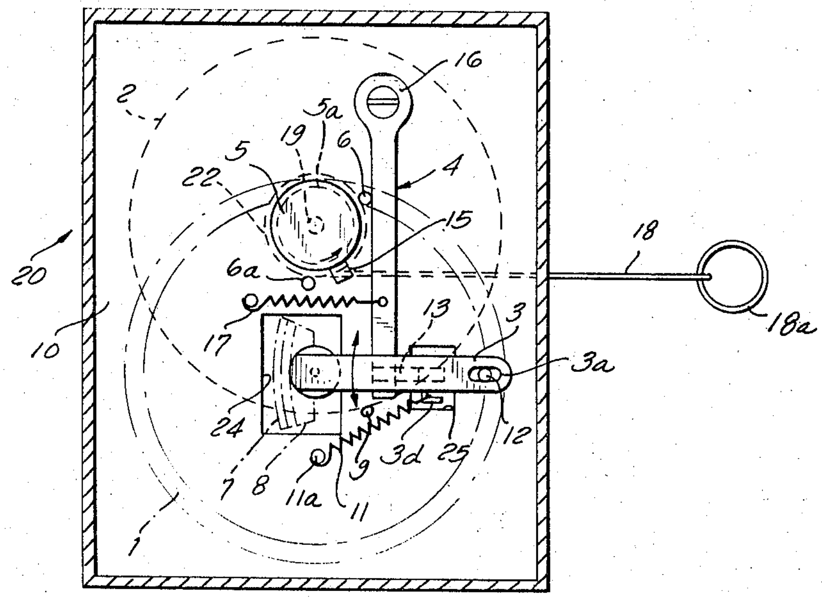
FIG. 2 is a horizontal section as seen in the direction of arrows from the line II—II of FIG. 1, the diaphragm and its contact element being shown by phantom lines.

Referring to the drawings in detail, FIGS. 1 and 2 show a sound reproducing apparatus which comprises a substantially tray-shaped housing or frame 20 having a bottom wall 20*a* which supports the shaft 19 of a turntable 21 for a disk-shaped record carrier 2. The turntable 21 is operatively connected with a spring motor including a reel 22 connected with one end of an energizing element here shown as a drawstring 18 having at its outer end an annular handle 18*a* which can be pulled by hand to energize the motor. The interior of the pulley 22 accommodates a customary torsion spring which stores energy during extraction of the drawstring 18 and rotates the turntable 21 and record carrier 2 when the handle 18*a* is released. The spring motor is arrested when the handle 18*a* reaches the outer side of the housing 20. The connection between the reel 22 and turntable 21 preferably includes a one-way clutch so that the record carrier 2 need not rotate when the drawstring 18 energizes the motor.

The housing comprises a partition 10 which extends transversely across the space above the record carrier 2 to serve as a support for a tone arm 3 and is located at a level below a loudspeaker diaphragm 1. The latter is connected to a perforated top wall 23 of the housing 20. The central portion or base of the diaphragm carries a specially configurated substantially wedge-like contact element 7 having an inclined contact face 8 which is engaged by the tone arm 3 during reproduction of sound to transmit vibrations to the diaphragm. In the illustrated embodiment, the plane of the contact face 8 and the exposed surface of the record carrier 2 are inclined with reference to each other and make an angle of about 45 degrees. However, it is equally possible to provide the element 7 with a contact face whose inclination is more pronounced or less pronounced. It was found that an angle of 45 degrees is very satisfactory. The inclined contact face 8 extends along an arc (see FIG. 2) whose center of curvature is located on the axis of a pivot pin 12 for the tone arm 3. The pivot pin 12 is mounted on the partition 10 and extends into an elongated guide slot 3*a* of the tone arm so that the latter can reciprocate in a direction substantially radially toward and away from the axis of the diaphragm 1. The radius of the arcuate contact face 8 equals the effective length of the tone arm 3. It is further to be noted that the length of the face 8 exceeds the distance between the outermost and innermost sound grooves in the exposed upper surface of the record carrier 2. Such sound grooves may form a continuous helix or a series of concentric helices each of which has a lead-in portion located at a maximum distance and a terminal portion located at a minimum distance from the axis of the shaft 19. In this way, the needle or stylus 3*b* of the tone arm 3 can track an entire sound groove but remains in requisite engagement with the contact face 8. The tone arm 3 is further provided with an inclined contact face 3*c* which is movable into and away from engagement with the contact face 8 on the element 7. The contact face 3*c* is provided at that end of the tone arm 3 which carries the needle 3*b*.

The underside of the tone arm 3 (namely, that side which is turned toward the grooved surface of the record carrier 2) is provided with a sloping cam surface or ramp 13 one end of which is adjacent to a stop 14. The stop 14 is provided at that (lowermost) end of the cam surface 13 which is located at a maximum distance from the contact face 8 and needle 3*b*.

The cam surface 13 forms part of a disengaging or lifting device serving to move the tone arm 3 upwardly and away from the sound groove of the record carrier 2 so that the needle 3*b* can be disengaged from the carrier and the tone arm can change its angular position to return the needle to a starting position, namely, into registry with the outermost convolution of the sound groove. The lifting device further comprises a lifting member here shown as a lever 4 which is turnable on a pivot 16 secured to the partition 10 and is biased by a helical contraction spring 17 so that it normally abuts against a fixed arresting pin 6 provided on the partition 10. The free end portion 4*a* of the lever 4 constitutes a follower which can slide along the cam surface 13 in a direction toward the stop 14 whereby the tone arm 3 is first tilted about the pivot pin 12 and is thereupon caused to move its face 3*c* away from the face 8 on the contact element 7. The lever 4 may consist of flexible metallic sheet stock but is held against flexing because it is slidable along the upper side of the partition 10. However, it is clear that the lever 4 may be rigid and that its free end portion 4*a* need not be supported by the partition 10. This partition further supports a rotary motion transmitting cylindrical cam 5 which is coaxial with the shaft 19 for the turntable 21. The cam 5 is coupled to the reel 22 by a friction clutch 5*a* so that it rotates with the reel only to the extent determined by the arresting pin 6, by a second arresting 6*a* (mounted on the partition 10), and by a radially outwardly extending projection or lobe 15 disposed between the arresting pins 6, 6*a* and affixed to or integral with the periphery of the cam 5.

A helical contraction spring 11 is connected to a median portion of the tone arm 3 and to a post 11*a* on the partition 10. The purpose of the spring 11 is to urge the needle 3*b* to a starting position in which the latter is located at a maximum distance from the shaft 19 and registers with the outermost convolution of the sound groove in the record carrier 2. The tone arm 3 is provided with a hooked spring retainer 3*d* which is connected with one end convolution of the spring 11. FIG. 2 shows clearly that the spring 11 also tends to shift the tone arm 3 in a direction to the left, i.e., toward the inclined contact face 8.

Figure 3:
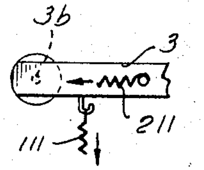
FIG. 3 is a fragmentary top plan view of a detail in a modified apparatus whose tone arm is biased by two springs.

As illustrated in FIG. 3, the tone arm 3 can be biased by two springs which replace the spring 11. The spring 111 urges the needle 3*b* in a direction radially of the record carrier 2 and away from the shaft 19. The spring 211 biases the tone arm 3 in a direction toward the face 8 of the contact element 7. The construction of FIG. 3 will be preferred in such sound reproducing apparatus wherein the tone arm 3 is to be subjected to more uniform bias, not only in a direction radially of the record carrier 2 but also in the longitudinal direction of its guide slot 3*a*. The spring 111 acts in a direction substantially at right angles to the longitudinal direction of the tone arm 3 and the spring 211 acts in a direction which is substantially parallel with such longitudinal direction.

During reproduction of sound, the record carrier 2 rotates in a clockwise direction, as viewed in FIG. 2. The contact face 8 slopes toward the exposed grooved surface of the carrier 2, as seen in the direction of such rotation.

When the reproduction of a sound sequence is completed, the handle 18*a* engages the outer side of the housing 20 and the record carrier 2 is arrested while the needle 3*b* extends into the innermost convolution (or one of the innermost convolutions) of the sound groove in the exposed surface of the record carrier 2. If the operator thereupon exerts a pull on the handle 18*a* in a direction to withdraw the drawstring 18 to extended position, the reel 22 rotates in response to unwinding of the drawstring and the aforementioned torsion spring of the spring motor stores energy. The cam 5 shares such rotation of the reel 22 (in a counterclockwise direction, as viewed in FIG. 2) until the lobe 15 reaches the arresting pin 6. From then on, the friction clutch 5*a* allows the reel 22 to rotate with reference to the cam 5. However, on its way toward engagement with the arresting pin 6, the lobe 15 rocks the lever 4 of the lifting device in a counterclockwise direction, as viewed in FIG. 2, whereby the free end portion or follower 4*a* of the lever slides along the cam surface 13 and moves the needle 3*b* of the tone arm 3 upwardly and away from the innermost sound groove in the record carrier 2. Once the free end portion 4*a* of the lever 4 reaches the stop 14 and the lobe 15 continues to rock this lever in a counterclockwise direction, the latter entrains the tone arm 3 in a direction to move the contact face 3*c* away from the contact face 8 whereby the slot 3*a* moves with reference to the pin 12 until the latter abuts against the leftmost portion of the surface bounding the slot 3*a*. The lobe 15 is then in or close to actual abutment with the pin 6 and remains in such end position until the operator releases the handle 18*a*. In the embodiment of FIGS. 1 and 2, the angular distance between the arresting pins 6, 6*a* is a little more than 90 degrees. When the lobe 15 abuts against the pin 6, the face 3*c* of the tone arm 3 is disengaged from the contact face 8 whereby the spring 11 or 111 automatically returns the tone arm to its starting position in which the needle 3*b* registers with the outermost convolution (lead-in portion) of the sound groove. A suitable stop member 9 on the partition 10 arrests the tone arm 3 in such starting position. The partition 10 has two cutouts 24, 25 for the needle 3*b* and stop 14.

When the handle 18*a* is released, the torsion spring of the spring motor begins to dissipate energy and rotates the reel 22 and turntable 21 in a clockwise direction, as viewed in FIG. 2. The cam 5 participates in such rotation until the lobe 15 returns into engagement with the arresting pin 6*a*. The lever 4 follows the bias of its spring 17 and moves its free end portion 4*a* away from the stop 14 and cam surface 13 so that the spring 11 or 112 can shift the tone arm 3 in a direction toward the contact element 7 whereby the face 3*c* is wedged against the face 8 and the tone arm transmits all of its vibrations to the diaphragm 1. The spring 11 or 111 is too weak to prevent the needle 3*b* from tracking the sound groove in the record carrier 2 so that the needle travels in the cutout 24 radially toward the shaft 19 and ultimately reaches the innermost convolution (terminal portion) of the sound groove upon completed reproduction of the entire sound sequence. The friction clutch 5*a* allows the reel 22 to rotate with reference to the cam 5 as soon as the lobe 15 reaches the pin 6*a*.

It is to be noted that the spring 11 or 111 automatically moves the tip of the needle 3*b* into the outermost convolution of the sound groove when the lever 4 returns into abutment with the pin 6 because the contact face 3*c* slides along the downwardly inclined contact face 8 and moves the needle substantially axially toward the exposed surface of the record carrier 2.

The drawstring 18 performs a series of important functions, namely, it energizes the spring motor by winding the torsion spring when the handle 18*a* is moved outwardly, it automatically arrests the turntable 21 when the handle 18*a* reaches the outer side of the housing 20, it causes the cam 5 to effect movement of the needle 3*b* away from the grooved surface of the record carrier 2 during winding of the torsion spring, it enables the spring 11 or 111 to return the needle into registry with the outermost convolution of the sound groove in automatic response to retraction of the face 3*c* from engagement with the face 8, and it also enables the spring 11 or 211 to move the needle axially into the outermost convolution of the sound groove when the torsion spring is allowed to dissipate energy. The quality of sound reproduction is surprisingly satisfactory because the inclined contact face 8 compels the needle 3*b* to remain in engagement with the record carrier. This is of particular importance when the apparatus of the present invention is embodied in a doll or in or on another toy device which might be subjected to rough treatment. The apparatus is very simple and occupies little room so that it can be readily installed in or on relatively small toy devices.

What is claimed as new and desired to be protected by Letters Patent is:

1. In a sound reproducing apparatus, a housing; a record carrier mounted in said housing for rotation in a predetermined direction about a predetermined axis and having an exposed surface provided with at least one sound groove having a lead-in portion located at a first distance and a terminal portion located at a second distance from said axis; a loudspeaker diaphragm carried by said housing adjacent to but spaced from said exposed surface; a tone arm mounted on said housing and having a needle arranged to track said sound groove and to thereby travel substantially radially of said record carrier; contact means provided on said diaphragm and having a contact face which is engaged by a complementary contact face of the tone arm while the needle tracks said sound groove, said tone arm being movable toward and away from the contact face of said contact means; and biasing means for urging said tone arm against the contact face of said contact means, one of said contact faces and the exposed surface of said carrier being inclined with reference to each other to converge toward a point spaced from the point of engagement of the tone arm in said predetermined direction in such a way that the needle is urged into said sound groove when said tone arm is caused by said biasing means to bear against the contact face of said contact means.

2. A structure as set forth in claim 1, wherein said diaphragm comprises a central portion and said contact means is provided on said central portion.

3. A structure as set forth in claim 1, wherein the angle of convergence between said exposed surface and one of said contact faces is more than 45 and less than 90 degrees.

4. A structure as set forth in claim 1, wherein said angle of convergence between said exposed surface and one of said contact faces is about 45 degrees.

5. A structure as set forth in claim 1, wherein said tone arm has an elongated slot extending substantially at right angles to the direction of travel of said needle in said sound groove, and further comprising pivot means fixed to said housing and extending into said slot so that the tone arm is reciprocable and turnable with reference to such pivot means.

6. A structure as set forth in claim 1, further comprising motor means mounted on said housing and energizable to rotate said record carrier in said direction, energizing means operative to energize said motor means, and lifting means responsive to operation of said energizing means to disengage the needle of said tone arm from said record carrier.

7. A structure as set forth in claim 6, wherein said motor means comprises a spring motor having a reel and said energizing means comprises a drawstring movable by hand from a retracted position in which at least a portion of the string is convoluted around said reel and an extended position, said lifting means being arranged to disengage the needle from said record carrier in response to movement of said drawstring to extended position.

8. A structure as set forth in claim 6, wherein said lifting means is arranged to move said tone arm away from engagement with the contact face of said contact means and to disengage said needle from said record carrier in response to operation of said energizing means.

9. A structure as set forth in claim 8, wherein said motor means comprises a spring motor having a reel coaxial with said record carrier and said energizing means comprises a drawstring movable by hand from a retracted position in which at least a portion of said drawstring is convoluted around said reel and an extended position, said lifting means comprising a cam surface provided on said tone arm, a lifting member movably mounted on said housing and having a follower movable along said cam surface to thereby disengage said needle from said record carrier, and motion transmitting means for moving said follower along said cam surface in response to movement of said drawstring to extended position.

10. A structure as set forth in claim 9, further comprising pivot means mounted on said housing, said tone arm being reciprocable, turnable and tiltable with reference to said pivot means, and further comprising stop means provided on said tone arm adjacent to said cam surface and engageable by said follower upon completed disengagement of said needle from said record carrier to thereby shaft said tone arm in a direction away from the contact face of said contact means on further movement of said drawstring to extended position.

11. A structure as set forth in claim 10, wherein said lifting member is a lever one end portion of which is pivotably secured to said housing and the other end portion of which constitutes said follower.

12. A structure as set forth in claim 11, wherein said motion transmitting means comprises a cam rotatably mounted on said housing and rotatable by said motor.

13. A structure as set forth in claim 12, wherein said cam is coaxial with said record carrier and comprises a lobe which is movable into and away from motion transmitting engagement with said lever.

14. A structure as set forth in claim 12, further comprising friction clutch means connecting said motor with said cam.

15. A structure as set forth in claim 1, wherein said biasing means comprises resilient means arranged to bias said needle to a starting position of registry with the lead-in portion of said sound groove.

16. A structure as set forth in claim 15, wherein said resilient means comprises a first spring for biasing said needle to starting position and a second spring for biasing said tone arm against the contact face of said contact means.

17. A structure as set forth in claim 15, wherein said first distance exceeds said second distance.

18. A structure as set forth in claim 1, wherein said tone arm is turnable about a second axis which is parallel with said predetermined axis and wherein the contact face of said contact means extends along an arc having its center of curvature located on said second axis.

19. A structure as set forth in claim 1, wherein said record carrier is a disk and wherein the axis of said diaphragm is parallel to but spaced from said predetermined axis.

20. A structure as set forth in claim 1, wherein said biasing means comprises means for biasing said needle into registry with the lead-in portion of said sound groove, and further comprising motor means energizable to rotate the record carrier in said predetermined direction, energizing means operative to energize said motor means, and disengaging means for moving said needle away from the terminal portion of said sound groove in response to operation of said energizing means so that said needle can return into registry with said lead-in portion.

References Cited

UNITED STATES PATENTS

| | | | |
|---|---|---|---|
| 1,979,067 | 10/1934 | Franklin | 274—1 |
| 3,165,320 | 1/1965 | Ryan | 274—1 |
| 3,208,755 | 9/1965 | Lieberman | 274—1 |

FOREIGN PATENTS

| | | |
|---|---|---|
| 1,436,696 | 1965 | France. |

LEONARD FORMAN, *Primary Examiner.*

D. A. DEARING, *Assistant Examiner.*

U.S. Cl. X.R.

274—1, 15